US00RE48313E

(19) United States
(12) Reissued Patent
Sparks et al.

(10) Patent Number: US RE48,313 E
(45) Date of Reissued Patent: Nov. 17, 2020

(54) PHYSICAL DIGITAL MEDIA DELIVERY

(71) Applicant: Cufer Asset Ltd. L.L.C., Wilmington, DE (US)

(72) Inventors: Kelly C. Sparks, Raleigh, NC (US); David A. Gust, Winter Garden, FL (US)

(73) Assignee: Cufer Asset Ltd. L.L.C., Wilmington, DE (US)

(21) Appl. No.: 15/201,009

(22) Filed: Jul. 1, 2016

Related U.S. Patent Documents

Reissue of:
(64) Patent No.: 8,767,967
Issued: Jul. 1, 2014
Appl. No.: 13/619,271
Filed: Sep. 14, 2012

U.S. Applications:
(63) Continuation of application No. 11/709,704, filed on Feb. 23, 2007, now Pat. No. 8,296,583.
(Continued)

(51) Int. Cl.
*H04L 9/30* (2006.01)
*G06Q 30/06* (2012.01)
(Continued)

(52) U.S. Cl.
CPC ..... *G06Q 30/06* (2013.01); *G11B 20/00086* (2013.01); *G11B 20/00188* (2013.01);
(Continued)

(58) Field of Classification Search
CPC ..... G11B 20/00188; G11B 20/00086; G11B 20/00224; G11B 20/00478;
(Continued)

(56) References Cited

U.S. PATENT DOCUMENTS 5,982,891 A * 11/1999 Ginter ..... G06F 21/10 348/E5.006
6,289,455 B1 9/2001 Kocher et al.
(Continued)

FOREIGN PATENT DOCUMENTS

WO WO 00/31744 A1 6/2000

OTHER PUBLICATIONS

International Search Report directed to related International Patent Application No. PCT/US07/05036, dated Sep. 28, 2007; 3 pages.
(Continued)

*Primary Examiner* — Matthew E Heneghan
(74) *Attorney, Agent, or Firm* — Sterne, Kessler, Goldstein & Fox P.L.L.C.

(57) ABSTRACT

The inventions relate to the delivery, transfer of content, and return of uniquely customized physical digital media. Digital content is specifically encrypted for use on a target player associated with a specific customer account. After use, the media is returned to a receiving location where use information is read from the media. Attention is given to cost of delivery, security of content, user experience in selecting, choosing, paying for, viewing or utilizing the content, and usage information created as a result of the content being utilized, rented, purchased, loaded or deleted.

38 Claims, 12 Drawing Sheets

Related U.S. Application Data

(60) Provisional application No. 60/776,776, filed on Feb. 24, 2006.

(51) Int. Cl.

| | |
|---|---|
| ***H04L 29/06*** | (2006.01) |
| ***G11B 20/00*** | (2006.01) |
| ***H04L 9/08*** | (2006.01) |
| *H04N 21/418* | (2011.01) |

(52) U.S. Cl.
CPC .. *G11B 20/00224* (2013.01); *G11B 20/00478* (2013.01); *G11B 20/00673* (2013.01); *H04L 9/0891* (2013.01); *H04L 9/0894* (2013.01); *H04L 63/0442* (2013.01); *H04L 63/0464* (2013.01); *H04L 2209/60* (2013.01)

(58) Field of Classification Search
CPC ..... G11B 20/00673; G06Q 30/06; H04L 63/0442; H04L 63/0464; H04L 2209/60
USPC ..... 380/281, 284, 282, 285; 713/193
See application file for complete search history.

(56) References Cited

U.S. PATENT DOCUMENTS

| | | | | |
|---|---|---|---|---|
| 6,367,019 | B1 | 4/2002 | Ansell et al. | |
| 6,883,097 | B1 | 4/2005 | Lotspiech et al. | |
| 6,903,286 | B2 | 6/2005 | Kaijala et al. | |
| 7,062,045 | B2 | 6/2006 | Riddick et al. | |
| 7,065,216 | B1 | 6/2006 | Benaloh et al. | |
| 7,162,646 | B2 | 1/2007 | Wu et al. | |
| 7,991,155 | B2 * | 8/2011 | Fujioka | G06F 11/1469 360/60 |
| 8,296,583 | B2 | 10/2012 | Sparks et al. | |
| 8,767,967 | B2 | 7/2014 | Sparks et al. | |
| 2002/0013772 | A1 * | 1/2002 | Peinado | G06F 21/10 705/51 |
| 2003/0016827 | A1 | 1/2003 | Asano et al. | |
| 2003/0097596 | A1 | 5/2003 | Muratov et al. | |
| 2003/0187654 | A1 | 10/2003 | Hoshino | |
| 2003/0233563 | A1 * | 12/2003 | Kruse | G06F 21/10 713/193 |
| 2004/0030909 | A1 | 2/2004 | Sako et al. | |
| 2004/0103288 | A1 | 5/2004 | Ziv et al. | |
| 2004/0109569 | A1 * | 6/2004 | Ellison | G11B 20/00086 380/277 |
| 2004/0111631 | A1 * | 6/2004 | Kocher | G06Q 20/367 713/194 |
| 2004/0133794 | A1 | 7/2004 | Kocher et al. | |
| 2004/0184616 | A1 | 9/2004 | Morten | |
| 2004/0243814 | A1 | 12/2004 | Nakano et al. | |
| 2005/0055311 | A1 | 3/2005 | Kosaki | |
| 2005/0081047 | A1 | 4/2005 | Kitani | |
| 2005/0084242 | A1 | 4/2005 | Mizutani et al. | |
| 2005/0108560 | A1 | 5/2005 | Han et al. | |
| 2005/0114689 | A1 | 5/2005 | Strom et al. | |
| 2005/0114869 | A1 | 5/2005 | Iwamura et al. | |
| 2005/0234826 | A1 | 10/2005 | Ohmori et al. | |
| 2006/0002561 | A1 | 1/2006 | Choi et al. | |
| 2006/0002564 | A1 | 1/2006 | Aihara et al. | |
| 2006/0291653 | A1 | 12/2006 | Kawada et al. | |
| 2007/0204349 | A1 | 8/2007 | Sparks et al. | |
| 2007/0297610 | A1 | 12/2007 | Chen et al. | |
| 2007/0300058 | A1 | 12/2007 | Takala et al. | |
| 2013/0061063 | A1 | 3/2013 | Sparks et al. | |

OTHER PUBLICATIONS

International Preliminary Report on Patentability and Written Opinion of the International Searching Authority directed to related International Patent Application No. PCT/US07/05036, dated Sep. 4, 2008; 5 pages.
Non-Final Rejection dated Jul. 9, 2010 for U.S. Appl. No. 11/709,704, filed Feb. 3, 2007; 22 pages.
Non-Final Rejection dated Dec. 10, 2010 for U.S. Appl. No. 11/709,704, filed Feb. 23, 2007; 22 pages.
Non-Final Rejection dated May 17, 2011 for U.S. Appl. No. 11/709,704, filed Feb. 23, 2007; 21 pages.
Non-Final Rejection dated Sep. 29, 2011 for U.S. Appl. No. 11/709,704, filed Feb. 23, 2007; 12 pages.
Final Rejection dated Jan. 6, 2012 for U.S. Appl. No. 11/709,704, filed Feb. 23, 2007; 19 pages.
Non-Final Rejection dated Mar. 15, 2012 for U.S. Appl. No. 11/709,704, filed Feb. 23, 2007; 21 pages.
Non-Final Rejection dated Jun. 18, 2012, for U.S. Appl. No. 11/709,704, filed Feb. 23, 2007; 5 pages.
Notice of Allowance dated Aug. 16, 2012 for U.S. Appl. No. 11/709,704, filed Feb. 23, 2007; 5 pages.
Non-Final Rejection dated Oct. 19, 2013 for U.S. Appl. No. 13/619,271, filed Sep. 14, 2012 ; 6 pages.
Notice of Allowance dated Feb. 21, 2014 for U.S. Appl. No. 13/619,271, filed Sep. 14, 2012 ; 7 pages.
Non-Final Rejection mailed Jun. 9, 2010 for U.S. Appl. No. 11/709,704, filed Feb. 23, 2007; 23 pages.
Non-Final Rejection mailed Dec. 10, 2010 for U.S. Appl. No. 11/709,704, filed Feb. 23, 2007; 23 pages.
Non-Final Rejection mailed May 17, 2011 for U.S. Appl. No. 11/709,704, filed Feb. 23, 2007; 22 pages.
Non-Final Rejection mailed Sep. 29, 2011 for U.S. Appl. No. 11/709,704, filed Feb. 23, 2007; 13 pages.
Non-Final Rejection mailed Mar. 15, 2012 for U.S. Appl. No. 11/709,704, filed Feb. 23, 2007; 22 pages.

* cited by examiner

PHYSICAL DIGITAL MEDIA DELIVERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of U.S. patent application Ser. No. 11/709,704, filed Feb. 23, 2007, now U.S. Pat. No. 8,296,583, which claims the benefit of U.S. Provisional Application No. 60/776,776, filed Feb. 24, 2006.

BACKGROUND

The inventions described and claimed herein relate to the delivery, transfer of content, and subsequent return of uniquely customized physical digital media (for example, CD, DVD, flash card, memory stick, optical, hard disk) referred to as "portable cartridge" or "hard drive" or "cartridge" via physical delivery (e.g. via mail, courier, customer pickup location, air, bus, transit, hand delivery, retail or outlet location, package drop, or other means to deliver a physical good) of a digital media that comprises one or more types of content. Digital content (files, movies, games, index information, movie trailers, pricing information, advertisements, pictures, audio samples, program executable code, algorithms) can be delivered to a user with a player (set-top box, computer, mobile, TV, stereo), herein referred to as "player", and made available for program updates, purchases or rent via a uniquely customized physical medium (for example, CD, DVD, flash card, memory stick, optical, hard disk) by way of physical delivery (for example, via mail, courier, customer pickup location, air, bus, transit, hand delivery, retail or outlet location, package drop, or other means to deliver a physical object). Care is given to the cost of delivery, the security of content itself, the user experience in selecting, choosing, paying for, viewing or utilizing the content, and the resulting usage information created as a result of the content being utilized, rented, purchased, loaded or deleted.

Existing methods of digital media content delivery are organized into two primary categories: 1) Physical delivery (mail, courier, customer pickup location, air, bus, transit, hand delivery, retail or outlet location, package drop, or other means to deliver a physical good), and 2) Digital transmission types of delivery (telephone, wireless, wireline, Internet, satellite, TV broadcast, radio, and other communication methods).

The film industry typically makes a distinction between these two types of delivery methods and will many times differentiate content availability based on the delivery method chosen. Each delivery method has its own security requirements for different types of content and different content sensitivities.

This patent document relates in part to the means to provide a secure and efficient/economical physical delivery system for digital content (e.g. CD, DVD, flash card, memory stick, optical, hard disk).

Physical delivery of digital media has been provided for many years in many forms both secured and un-secured. In the area of secured physical distribution, many existing methods are used to secure content for mass audience consumption. These include encryption schemes that are tied to secrets that are locked inside a particular manufacturer's player as is the case for DVD's, to content keys that are used to unlock software for installation on personal computers.

These methods of protecting content are well known to anyone skilled in the art of content protection schemes.

Updated content protection schemes such as those being developed for high definition (HD) formats (e.g. HD-DVD and Blu-Ray) include higher bit keys and methods to update the encryption schemes on player devices for content that is cracked. These new methods add additional levels of obfuscation than that used by the current methods for DVD encryption. The new abilities to update encryption schemes and keys for cracked content will not provide security for the current cracked content, but merely provide an updated scheme or key for all new content that is physically delivered. So while these new schemes for HD content have increased security, they do not enable all existing content shipped or bought by customers to be updated; only the new content is updated. Additionally these methods for encryption can not effectively tether content to a specific unique player because of the very nature of mass market production. Instead the content is encrypted in such a way with keys that are secret, but that are distributed by a manufacturer. So you have many manufacturers who have their own sets of keys that can be used to unlock the content. The content by definition has many hashed keys that exist in many different manufactured player devices, all of which can be used to unlock the same content.

In the non-physical delivery methods, content keys can be uniquely encrypted for a single device at distribution time because the content is broadcast or downloaded electronically and can be digitally signed as needed to protect the content. In these types of methods, which are also well known to anyone skilled in the art of encryption, content can be successfully tethered to a single device so that there is only one key/player that can play back the content.

SUMMARY

The inventions described herein are directed to overcoming current obstacles and creating new ways to improve the delivery, transfer of content, and subsequent return of uniquely customized physical digital media (for example, CD, DVD, flash card, memory stick, optical, hard disk) via physical delivery (for example, via mail, courier, customer pickup location, air, bus, transit hand delivery, retail or outlet location, package drop, or other means to deliver a physical good) of a digital media that comprises one or more types of content.

Physical digital media delivery arrangements described herein deliver a uniquely customized digital media (for example, CD, DVD, flash card, memory stick, optical, hard disk) to a user that can be docked or placed into a player which then updates the player with the unique/personalized content and the player updates the physical media with user information comprising billing data, usage information, and other collected history. Once content has been updated to and from the digital media, the media is returned to a centralized or regional location for further processing.

DETAILED DESCRIPTION

Figure 1:
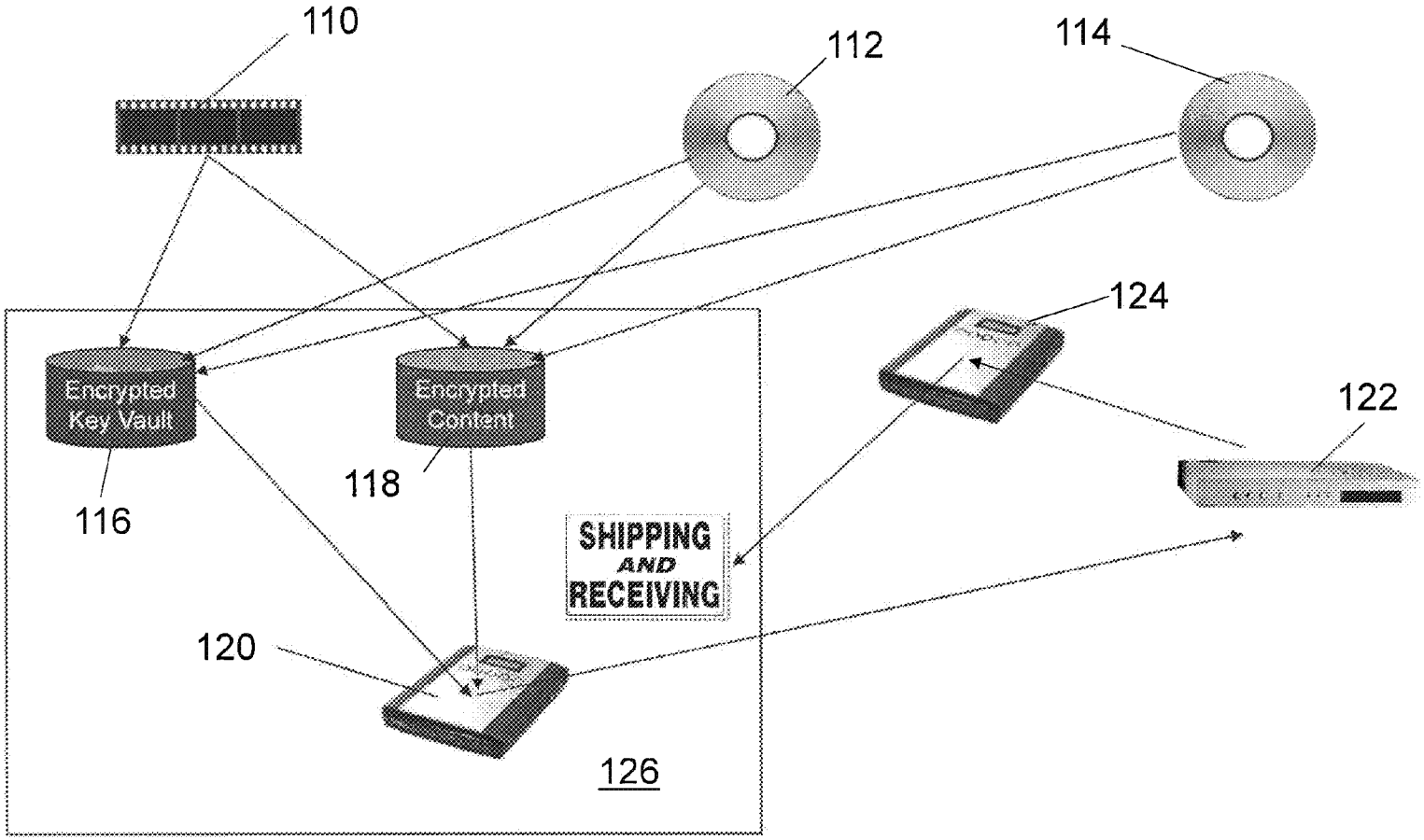
FIG. 1 is a schematic diagram of an arrangement for the physical delivery of digital media according to the inventions.

While the inventions will be described more fully hereinafter with reference to the accompanying drawings, in which aspects of the preferred manner of practicing the present invention are shown, it is to be understood at the outset of the description which follows, that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

The inventions described herein are directed at least in part to:

- How to recover from hacked encryption schemes and keys for distributed content.
- How to provide physical delivery with a secure and yet compelling user experience while selecting, choosing, paying for, viewing or utilizing the content that is delivered to a user.
- Methods for customer to choose the customized content that is to be shipped to them.
- User Interface designs that provide customized support to the user and feedback to the user while the content is copied from one media to another and assistance or reminders on how to package and return the media once the information has been copied.
- Methods for archiving and backing up lower priority content for later retrieval.
- Methods for moving content securely from the player to a portable device.
- Means to rebuild a user's player if they have a catastrophic system failure and all or some portion of their data is corrupted or deleted.
- Methods of utilizing broadcast based encryption algorithms for non-broadcast content.
- Enabling content to be delivered before it is released for viewing.
- Enabling content to be viewed during a selected time-frame or window of time.
- Delivery options for users who may be moving or on vacation for some duration of time.
- Intelligence that prevents current titles under rental or purchase from being erased or removed without the user's permission.
- Delivery of the same content in different formats for different device types.
- Time, date, time zone, and country management that provides content owners with geographic and time based services for content playback rights.
- Tamper resistant methods for securing secrets on a hardware device that can be used to secure content and identify approved hardware.
- Methods to encrypt secured content a second time to a device to tether the content to that device with local private keys only known to the player itself.
- Methods to erase secured information after it has been successfully copied to a player or device.
- Methods for enabling multiple player devices in the home to be updated from a single media.
- Methods for delivering unique and personalized content to one or more player devices.
- Methods of uniquely recording massive amounts of data in the 250 GB range or larger, to a plurality of media in a timely fashion.
- Enabling automated manufacturing lines to uniquely recording massive amounts of data in the 250 GB range or larger, to a plurality of media in a timely fashion.
- Reuse of media for different users.

FIG. 1 is a schematic diagram of an arrangement for the physical delivery of digital media according, to the inventions. Original content could, for example, be a video file 110 from a video content provider, an electronic game file 112 from a game content provider, or a music file 114 from a music content provider. Content from any of these sources or from other sources not mentioned is encoded and encrypted using encryption keys stored in an encrypted key vault 116. Encrypted content is stored in a storage device 118. Storage device 118 could be any suitable storage for digital files including but not limited to hard drives, optical drives, solid state memory, etc. Encryption keys and content are stored in different physical or logical locations (e.g. key vault 116 and storage device 118 as shown in FIG. 1). This figure shows the movement of content and keys to a physical digital device that are specifically tethered to a specific device.

The inventions provide a physical digital media delivery system that delivers a uniquely customized digital physical media 120 (for example, CD, DVD, flash card, memory stick, optical, hard disk) to a user that can be docked or placed into a player 122 which then updates the player with the unique/personalized content. Physical media 120 has stored therein a specific encryption key(s) for a particular target player such as player 122 shown in FIG. 1. When physical media 120 is delivered to a customer it is thus uniquely encrypted for use by a particular player 122 and will not be playable by another player for which it is not encrypted.

When the physical media 120 is played, the player 122 updates the physical media 120 with user information comprising billing data, usage information, and other collected history. Physical media 124 shown in FIG. 1 represents a media that has been so updated. Once the content has been updated to and from the digital media, the media is returned to a centralized or regional location such as a shipping and receiving location 126 for further processing.

Figure 2:
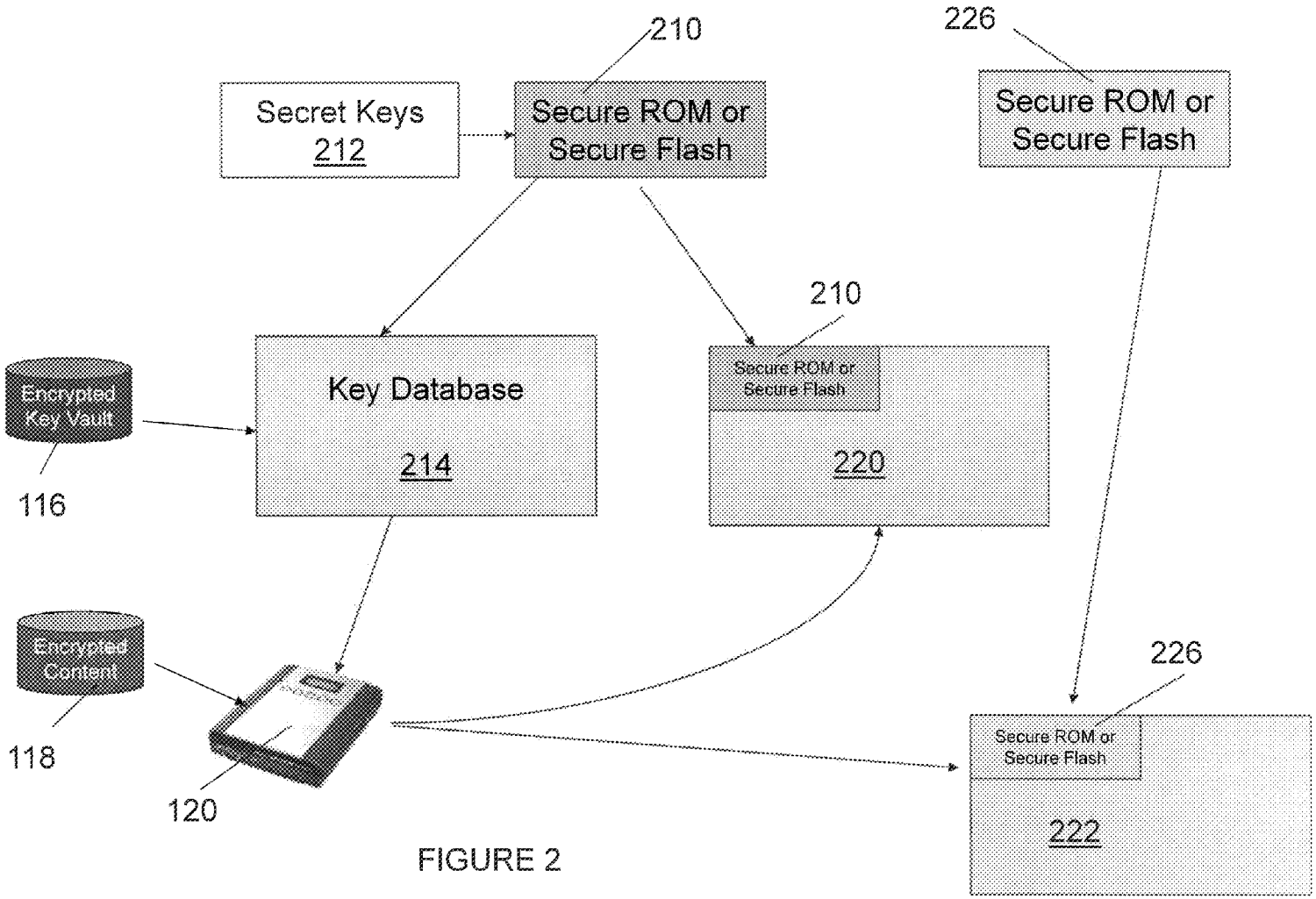
FIG. 2 is a schematic diagram of an embodiment of the inventions illustrating how keys and secrets can be utilized during manufacturing on secure ROM and/or secure flash memory, to provide a key system that can be used to uniquely encrypt selected keys for selected content so that the resulting keys for content can only be utilized by the specific target player.

FIG. 2 is a schematic diagram of an embodiment of the inventions illustrating how keys and secrets can be utilized during manufacturing on secure ROM and/or secure flash memory, to provide a key system that can be used to uniquely encrypt selected keys for selected content so that the resulting keys for content can be utilized only by the specific player requesting the content.

The specifics of key encryption are not described herein. Well known key encryption algorithms can be used in these inventions. The inventions described herein do not relate to these specific algorithms, but rather to how they are utilized in arrangements including systems and methods for providing secure digital media. It should be understood that one skilled in the art of encryption could implement the details of the key encoding/encryption processes.

As shown in FIG. 2, the arrangement is capable of encrypting for selectable titles for more than one player. Each player can have its own set of content so the keys and titles may be the same or may be different for each player. Only one physical disc is required to serve one or more players. A secure ROM or secure flash 210 is loaded with secret keys 212 and or serialization codes at the time of its manufacture. Some keys/codes 212 are known to central processing while others are not known. Key data from secure ROM or secure flash 210 is downloaded to a key database 214. Key database 214 generates uniquely tethered key bundles. Key database 214 also receives keys selected for content from encrypted key vault 116 (see also in FIG. 1). Keys for selected content encrypted and tethered to a specific player are downloaded into physical media 120, which also receives selected content from storage device 118. In this embodiment there are shown two players—player 1, indicated by reference numeral 220 and player 2, indicated by reference numeral 222.

After manufacture of a secure ROM or secure flash 210 and after its key information has been downloaded into key database 214, it is installed into player 1, indicated generally by reference numeral 220. Similarly, after manufacture of another secure ROM or secure flash 226 and after download of its key information into key database 214, it is installed into player 2, indicated generally by reference numeral 222. Thus, player 1 and player 2 have unique private keys built into them.

During preparation of physical media 120, selected keys for selected content are uniquely encrypted/tethered to a specific player such as player 1. The same physical media 120 can also have stored therein selected keys for selected content stored in a second file for a second player such as player 2 at the same delivery address. Thus, one physical media can become played by two or more players at a particular location. For example, a family might have multiple players (living room, bedroom, etc.) and be able to play the content on any one of its subscribed players.

Figure 3:
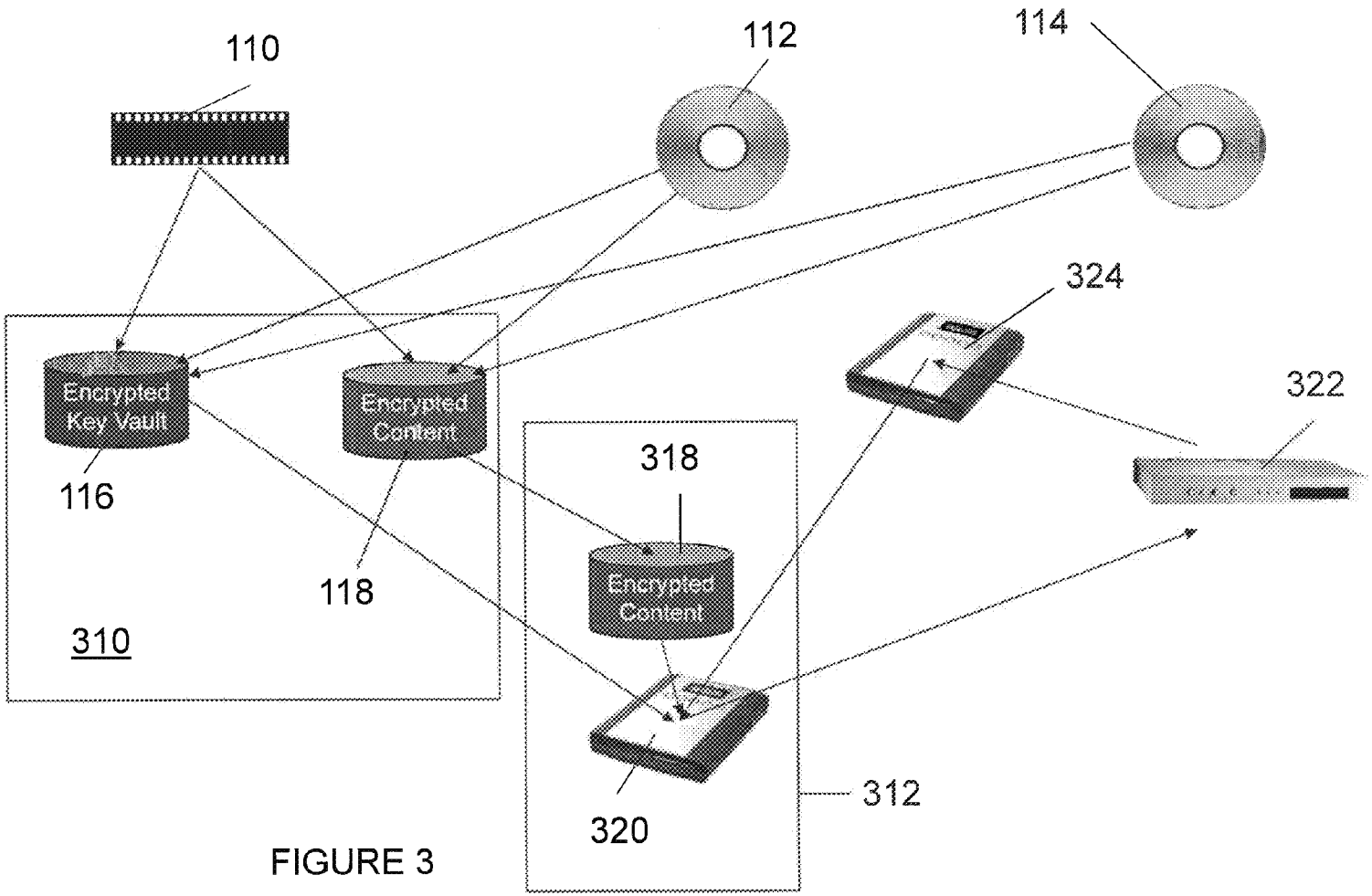
FIG. 3 is a schematic diagram of an embodiment of the inventions illustrating regional distribution of content and how users can deliver and receive portable cartridges.

FIG. 3 is a schematic diagram of an embodiment of the inventions illustrating the concept of regional distribution of content and how users can deliver and receive portable cartridges. Regional locations such as regional location 312 have a copy of the encrypted content from storage 118. The local encrypted content for regional location is stored locally in a storage unit 318 and is used for recharge purposes. Keys stored in key vault 116 are not stored in the regional locations such as regional location 312. An encrypted tunnel (well known to those versed in the art of networking and communications) can be used to deliver the required uniquely encrypted keys to the physical media such as physical media 320. Users who optionally elect to pick up their portable cartridges in person would be prompted near the end of their current content (on the player) expiration, to pick up their portable drive at their local regional location, such as regional location 312. The physical media, such as physical media 320 contain information about where they have been shipped from and therefore are knowledgeable about where the next scheduled pickup or shipment will be.

Content that is desired to be accessed by a user that also must be secured and provided to the user in an easy to use fashion first begins with an encrypting process such as shown in FIG. 1. Content is first encrypted utilizing known cryptographic techniques. For example, it is possible to utilize a known broadcast encryption scheme wherein a "seed" key is utilized to start the encryption process. The seed key is discarded after initialization and then further keys are generated utilizing a secret decryption algorithm. The broadcast encryption algorithm is utilized in a non-broadcast application because it provides additional security since the seed key is read and utilized for a very short (milliseconds) time frame. Then it is discarded.

Keys for the encrypted content are stored in a key vault such as key vault 116 shown in FIG. 1. Key vault 116 can also store digital rights that can include rules for content usage, such as number of rental days per rental, specific time/date or time/dates when the content is permitted to be viewed, pricing data for rental and/or purchase or other payment options.

Once content has been encrypted, the content and the keys are stored in separate databases and/or separate locations (116 and 118) for security purposes as shown in FIG. 1.

Players, such as player 122 (FIG. 1) and players 220 and 222 (FIG. 2) and player 322 (FIG. 3), are manufactured with private keys securely stored in firmware, secure flash or secure ROM, and/or in a hidden partition on a storage media inside the player (such as secure ROM or secure flash 210 and 226 (FIG. 2)). Additional protection can be added to the player by utilizing proprietary connectors to reduce the ability of users to accidentally or intentionally attempt to connect the player's local storage (e.g. hard drive) to a personal computer or other standardized plug.

The processing location also has access to a set of public keys that are specifically tied to the private keys stored on the players (FIG. 2). Users who desire to access the information supply a list of content they wish to have sent to them. The list of content is provided to a central or regional processing location via a returned disc, via a phone call, via an interne form, or e-mail, or in person (see FIG. 1 illustrating returned physical media 124). An information request is created by a user accessing a list of available titles from a menu that lists titles based on a user's preferences, previous selections and what content or information they currently already have, for example. It should be noted here that a full copy/list of all available titles and their corresponding file sizes are kept in both the central or regional centers as well as distributed throughout the portable cartridges which facilitates the selection of content and ensures that users don't select more content than can be stored and shipped via the portable cartridge(s).

The request for information can also include specific content format information. For example, a movie title might be requested in high definition, but also requested in standard definition and a lower resolution that will be utilized on a smaller screen or portable player.

As shown in FIGS. 1 and 2, once a content request is known, a processing location retrieves the already encrypted content/information and copies it to a portable physical media device or cartridge. Additionally the keys required to unlock the content are uniquely encrypted with the public keys of the player that the content is destined for. In this way, the keys to unlock the content can only be accessed by the player that requested the content.

The physical media can also be loaded with an "Authentication" file that is utilized by the player to ensure the cartridge is encoded specifically to a specific player.

As an alternative, the keys can be encrypted utilizing additional sets of public keys for additional players that reside at the same physical ship-to address. In this embodiment, the portable physical cartridge can be plugged into multiple players (FIG. 2).

As another alternative, the portable physical cartridge can be plugged into only one device and the multiple players communicate wirelessly to send and receive the requested content.

Figure 4:
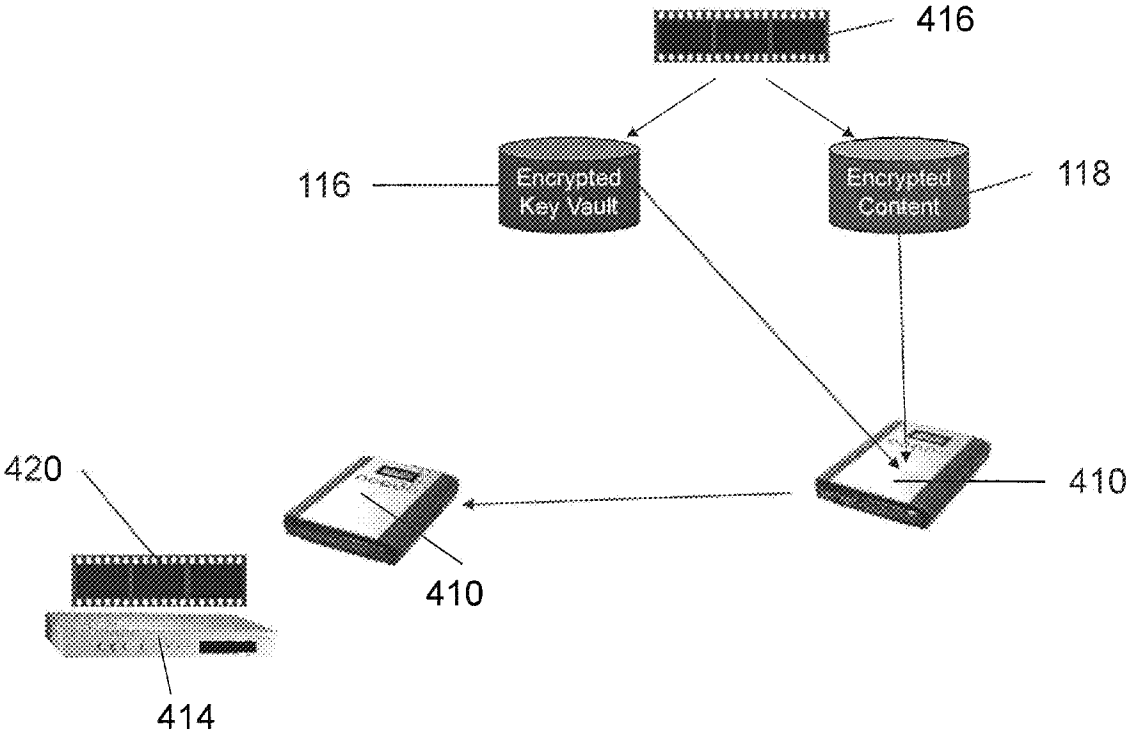
FIG. 4 is a schematic diagram illustrating the capability of the system to re-encrypt content and push it out to all current users of the specific content.

FIG. 4 is a schematic diagram illustrating the capability of the system to re-encrypt content and push it out to all current users of the specific content. Content can be pushed for any reason, but in this specific embodiment the reason shown is compromised content. Assume that a video file such as file 110 (FIG. 1) has been compromised. Such a file with compromised content is indicated by reference numeral 416. Compromised content, such as file 416 is re-encrypted with new algorithms, keys, etc. and stored in the database 118 and any copies thereof at regional locations. Based on database records, all existing users of the compromised content will receive an automatic update of the new content uniquely tethered to their respective players. Compromised content algorithms and keys are deleted and replaced with newly encrypted content algorithms and keys. Physical media 410 contains updated content. Physical media 410 is delivered to a customer associated with one or more target players, such as player 414, for which the updated content is intended. Then, target player 414 is able to play file 420 which was re-encrypted.

Figure 5:
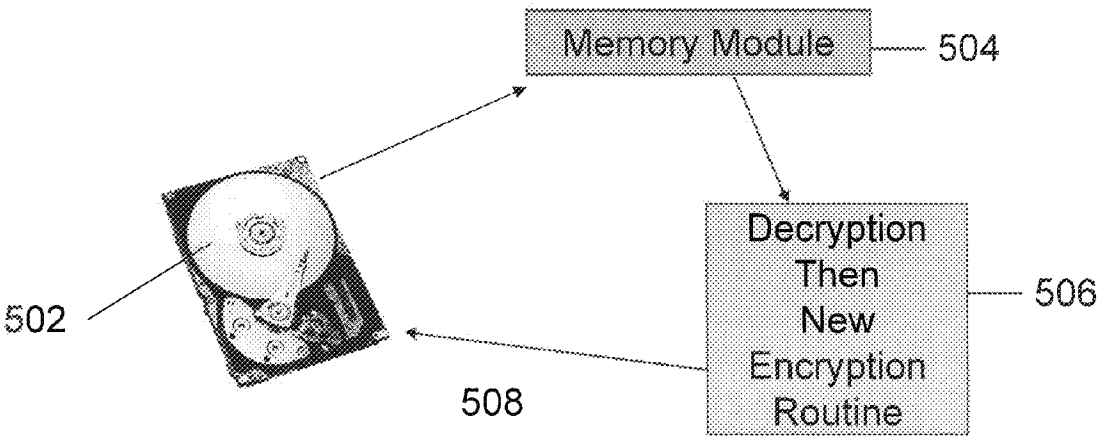
FIG. 5 is a schematic diagram depicting an arrangement whereby a self-contained hard drive or other writable device can utilize block read and write techniques (such as in defrag utilities) to read blocks of data, decrypt them, then, re-encrypt them with a different key and/or algorithm.

FIG. 5 is a schematic diagram that depicts a method whereby a self-contained hard drive 502 or other writable device could utilize block read and write techniques (as might be common in defrag utilities) to read blocks of data, decrypt them, and then, re-encrypt them with a different key and/or algorithm. Such a process can be utilized to switch an encryption scheme inside a player if desired. Such a process might be utilized in the event an encryption change is deemed to be desirable due to system compromise. First, content sectors of hard drive 502 are read into a memory module 504 as in a standard defrag type of operation. As hard drive 502 is being defragged, the content is decrypted at 506 using the old encryption scheme, then re-encrypted using the new scheme. The contents are then written back at 508 to hard drive 502 using block write techniques. The process described by FIG. 5 can be utilized to switch an encryption scheme inside a player if desired. In the picture shown, the purpose of the encryption change is due to compromises in the system.

Figure 6:
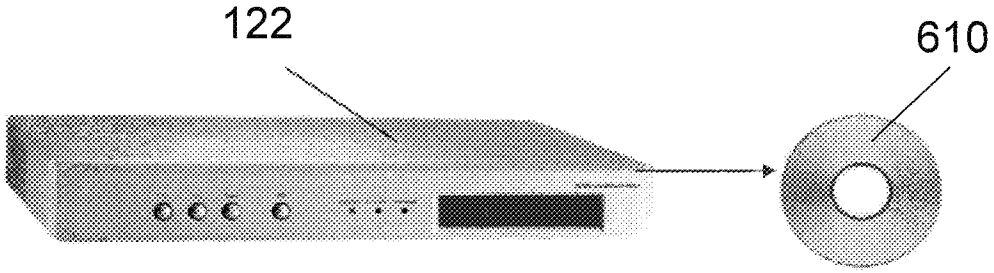
FIG. 6 is a schematic diagram illustrating an arrangement in which local tethered content can be archived or copied to another writeable media for backup reasons, or for playability on another device such as a portable player.

FIG. 6 is a schematic diagram that shows a process in which local tethered content can be archived or copied by a player 122 to another writeable media 610 such as an optical disk for backup reasons, or to be played on another device such as a portable player. A user selects content to be archived. The content is burned to media 610 for storage. The user can then restore data from media 610 as needed.

Figure 7:
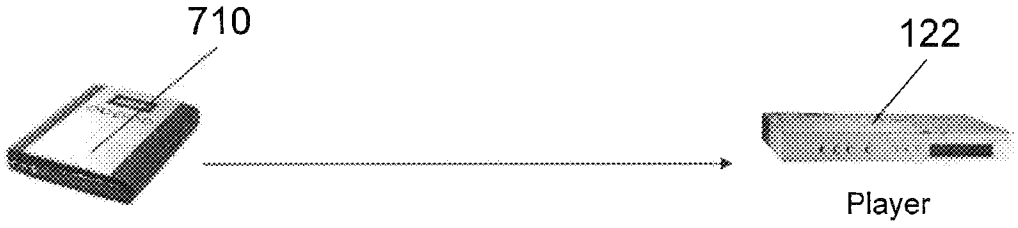
FIG. 7 is a schematic diagram illustrating the use of Secure Flash/Processor that contains clock and calendar capability that can be utilized in the physical digital media device to ensure a player has the correct time, date and time zone settings.

FIG. 7 is a schematic diagram that illustrates the use of secure flash processor that contains clock and calendar capability that can be utilized in the physical digital media device to ensure a player 122 has the correct time, date and time-zone settings. The processor is shown as being built into digital media 710, but in other embodiments it could be a separate device. Accurate time and date are pulled directly from known accurate clock sources such as the atomic clock in Boulder, Colo. The physical drive such as media 710 is built to include a secure flash processor, such as, for example, a TI MSP430, that provides clock, calendar and timer functionality. At build time, the clock and timers are checked to ensure they have the proper Greenwich Mean Time (GMT) time and the time zone is set based on the ship-to address of the user. The drive 710 is then shipped to the user. When the drive 710 is inserted into the player 122 the time, date and time-zone are checked, verified and updated as necessary.

Figure 8:
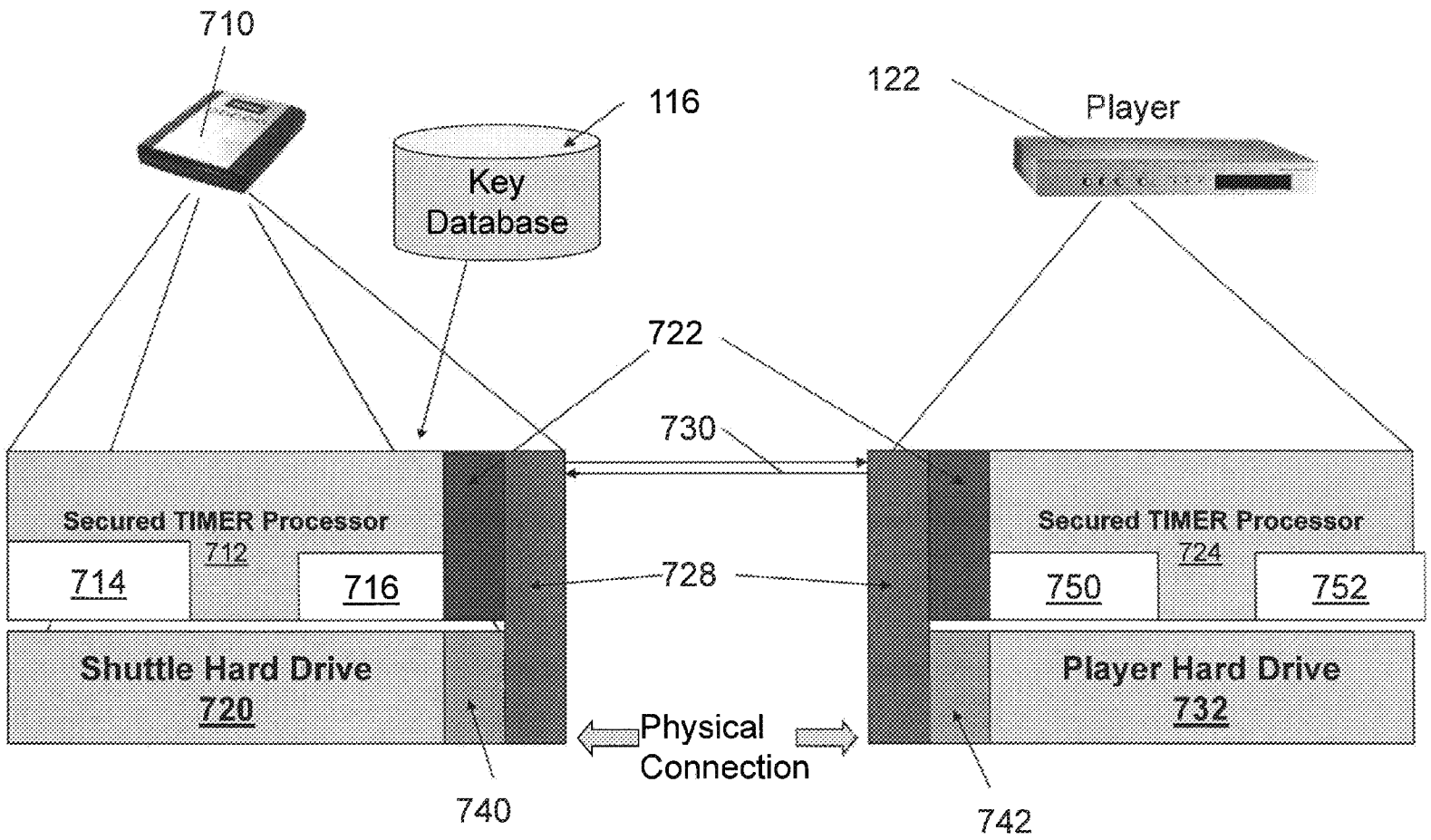
FIG. 8 is a schematic diagram of an embodiment in which a clock/date/time-zone processor is managed so that specific time, date, and time-zone settings will only be applied to the correct and specific player or players.

FIG. 8 is a schematic diagram of an embodiment in which a clock/date/time-zone processor is managed so that that specific time, date and time-zone settings will be applied only to the correct and specific player or players. In one embodiment the cartridge 710 has a secured timer processor 712. Processor 712 has embedded firmware, adapted/embedded into it that utilizes public keys for the target player 122 for unique authentication. For example, processor 712 can be a secured flash microprocessor such as a TI MSP430. The processor has associated with it clock timers 714 and a battery 716. In an alternative embodiment there is a battery housed with the processor that enables it to run clock and calendar functions, which can be utilized to verify the target player 122 has the accurate current time and date. Security is built into the processor to avoid users tampering with the time/calendar settings. Alternatively, the secure processor 712 stores the specific time zone based on the user's ship-to address. The secure processor 712 need not be physically attached to the portable cartridge 710, but rather shipped along with the cartridge. Accurate time and date are pulled directly from known accurate clock sources such as the atomic clock in Boulder, Colo. The secure processor can also include a wireless (IEEE 802.xx, cellular or other wireless technology) chip that is utilized to communicate to a similar wireless technology inside the player. In the case of a hard-drive system, cartridge 710 also includes a standard hard-drive 720, which interfaces through an ATA, SATA, SCSI serial bus connector 740, or the like. Cartridge 710 also includes a secure timer processor generator 722.

The process of building mass quantities of customized hard drives involves a vast array of high speed storage and replicated distributed data built into a network that is capable of delivering aggregate speeds in excess of 100 Gigabits per second. One such file system operating at these speeds is the IBM General Parallel File System (GFPS), which has been engineered for supercomputing projects. In one embodiment, this file system or other high speed file system is utilized by developing a special portable cartridge node that is suited to drive data movement instead of supercomputing (CPU intensive) applications. Each node which is connected to the high speed file system via a high speed non-blocking switch, comprises processors and drive bays required to hold a plurality of portable cartridges.

When the portable physical media cartridge is stored with the requested content, it is physically shipped to the location that requested the content based on known user address information on file (FIGS. 1 and 2).

Upon receipt of the portable physical cartridge, the user connects or plugs in the cartridge to their one or more players. In one embodiment, the cartridge utilizes standard connectors to attach to the player. In another embodiment, a proprietary connector is utilized to support additional functions such as time and date features from an onboard clock and/or to reduce the ability of users to accidentally or intentionally attempt to connect the cartridge to a personal computer or other standardized plug. Reference numeral 728 refers generally to whatever connector is chosen to connect cartridge 710 with a similar connector 728 associated with player 122. Connectors 728 exchange data relating to secure authentication, clock timer and data updates as represented by signal lines 730.

Once the cartridge 710 is physically connected, the player 122 accesses the information on the cartridge 710. In one embodiment the player utilizes private keys to attempt to decode the "Authorization" file to ensure the contents of the cartridge can be accessed. In another embodiment, the secure processor 712 embedded with the cartridge 710 sets up an encrypted tunnel to the player 122 to a secure processor 724 on the player. Secure processor 724 can be, for example, a TI MSP430. It also has associated with it clock timers 750 and a battery 752. Processors 712 and 724 negotiate a secure channel for the transfer of key data. Once the cartridge and the player have been authenticated, the transfer of data and information begins. Keys for content are stored in the player in their uniquely tethered/encrypted state and are therefore only accessible to the target player 122. Content is copied to the player in its original encrypted state as well. Player 122 includes a player hard drive 732 for storing data read from cartridge 710. Hard drive 732 interfaces through an ATA, SATA, SCSI serial bus connector 742, or the like.

Key database 116 at a regional or central location is used to ensure the time, date and time zone updates can be applied only to the specific player or players targeted for a particular transaction.

In another embodiment the encrypted material is encrypted a second time (FIG. 10) as it is being stored on the player. This encryption is performed by the player itself in which the player utilizes its own secrets known only to the player itself. Several methods exist to accomplish local unique storage: (1) local unique serializations embedded into chips in the player or hard drive can be used to encrypt content before being written to the device; and (2) hard drive manufacturers have methods of hiding information in hidden partitions or trusted drives can be uniquely tied to the hard drive controller via firmware secrets, which ensure each read or write of data is trusted. In another embodiment the portable cartridge connects to the player and after authentication the secure processor on the portable cartridge communicates to the player and checks the player's clock, calendar and time-zone information, and corrects or adjusts these settings as needed to ensure the player has accurate time, date and time-zone settings.

As content is being written from the portable cartridge 710 to player 122, care is taken to ensure that wanted content currently on player 122 is not erased. If cartridge 710 contains more content than the player has space for, the transfer will overwrite titles that have already been seen and have past their viewing period. Next titles which have not been seen will be overwritten or a prompt is provided to the user to approve the change. Titles under current viewing windows require a user to approve the overwriting. In another embodiment a simple title list (FIG. 11) is shown of the new content and the existing content, and the user is provided a single click to approve or disallow selected titles to be updated.

Figure 9:
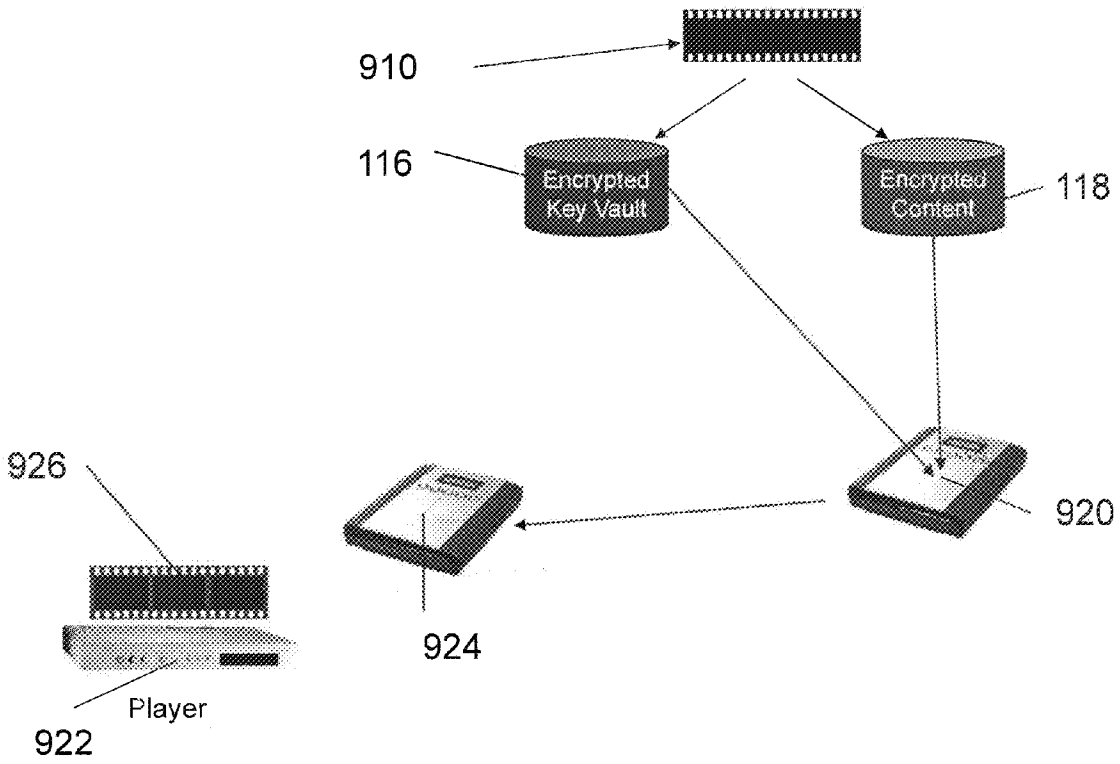
FIG. 9 is a schematic diagram illustrating how keys can be stored with additional metadata that apply to rights management such as allowable time to view.

FIG. 9 is a schematic diagram illustrating how keys can be stored with additional metadata that apply to rights management such as allowable time to view. Content such as a video file 910 is encrypted and stored in the encrypted content storage 118 along with digital rights that determine the date and time the keys are allowed to be seen. The content is stored along with the digital rights keys on a drive such as cartridge 920 in order to provided a "loaded" cartridge 924. When the tinier in the player passes the allowed time for the keys, the content becomes visible to the user so that the user can rent it. If the keys are blocked for periods of time, then the content will also be blocked.

Figure 10:
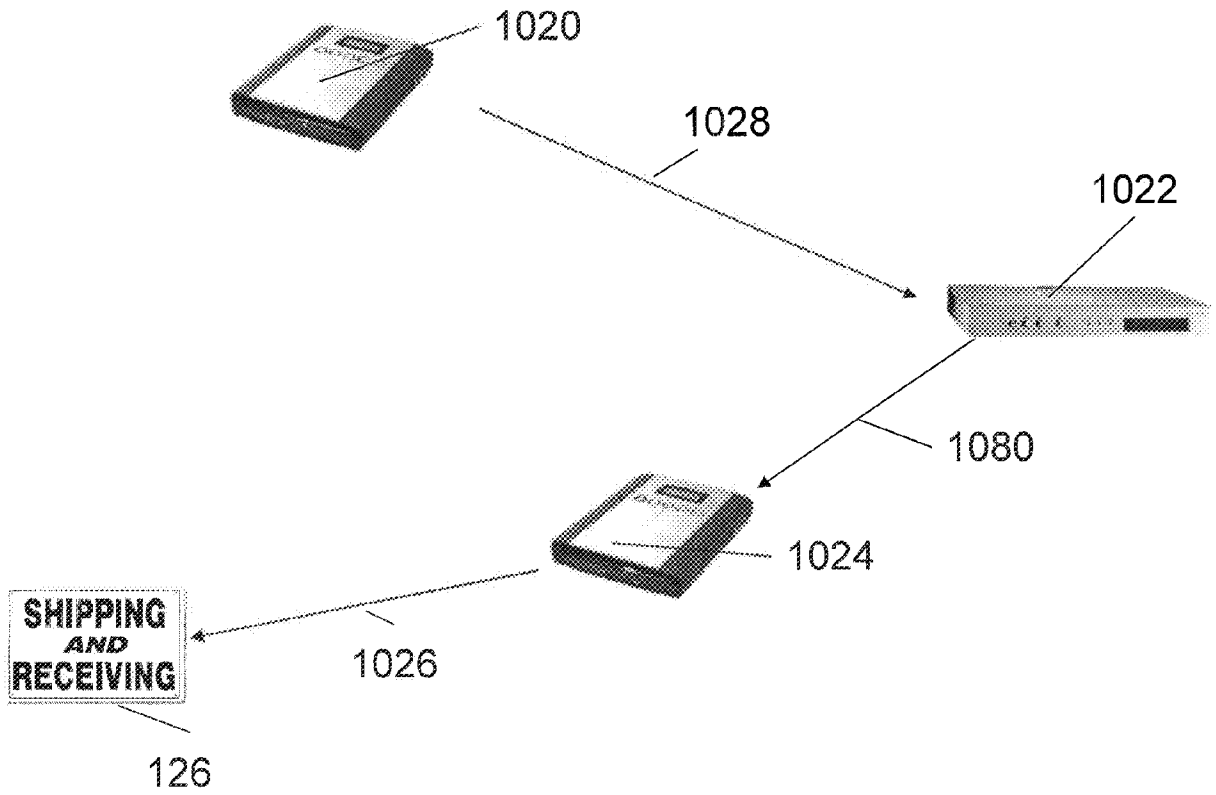
FIG. 10 is a schematic diagram that depicts a method of delivering secured content to the player with a second/additional local encryption applied during the transfer of the data to the player.

FIG. 10 is a schematic diagram that depicts a method of delivering secured content to the player with a second/additional local encryption applied during the transfer of the data to the player. A cartridge 1020 with tethered content tied to a specific player 1022 is shipped (indicated by arrow 1028) to a user. After being received by the user, content is copied from cartridge 1020 to player 1022. While the content is being copied, it is further encrypted utilizing understood local encryption with secret information known only to player 1022. After successful transfer of data, the original secured data is deleted, erased, hidden, or scrambled (indicated by arrow 1080) so the cartridge 1024 is of no further use until it is rebuilt for another player. Cartridge 1024 is then returned, indicated generally by arrow 1026 to a shipping and receiving location 126 for further processing.

According to one embodiment, once the contents of both the portable cartridge and the player have been successfully transferred and/or updated, the original secure key content and/or the content itself on the portable cartridge is erased, hidden, removed, garbled, or otherwise rendered useless. This is done to further protect the content information from any unauthorized access. When completed, the user places the portable cartridge into a pre-addressed shipping envelope and drops it in the mail. When the cartridge is received at a central or regional location, the drive is opened and connected to a read/transfer system that pulls and extracts the required billing and other information into a central or regional system for further processing. During billing reconciliation, users' rentals and purchases are tallied and sent to a billing system. Key elements of billing such as owned titles or rent to own plans are tallied and kept up to date so that users are not charged for titles they own, and running totals are kept for users who are in the process of renting to own. It should be noted here that ownership in a title may be a virtual ownership, and the user effectively has purchased an unlimited viewing right to the title. Users also may be on a plan that gives them a certain number of rentals each month, and in these cases, the rentals up to that amount are not charged individually because they fall within the user's rental limit.

In the event a user has a system that requires service or their system is broken, the entire library of the user can be recreated for them. In this case, the central or regional location has a list of the current content that is both resident on the player and a list of all archived content. With this information, a substitute player can be rebuilt and populated with content and keys for a replacement. It should be noted that during a replacement the user's information in the central or regional location is updated with the new specific replacement player information. This is done to ensure that the new player and the new portable cartridges will match up in subsequent mailings.

Figure 11:
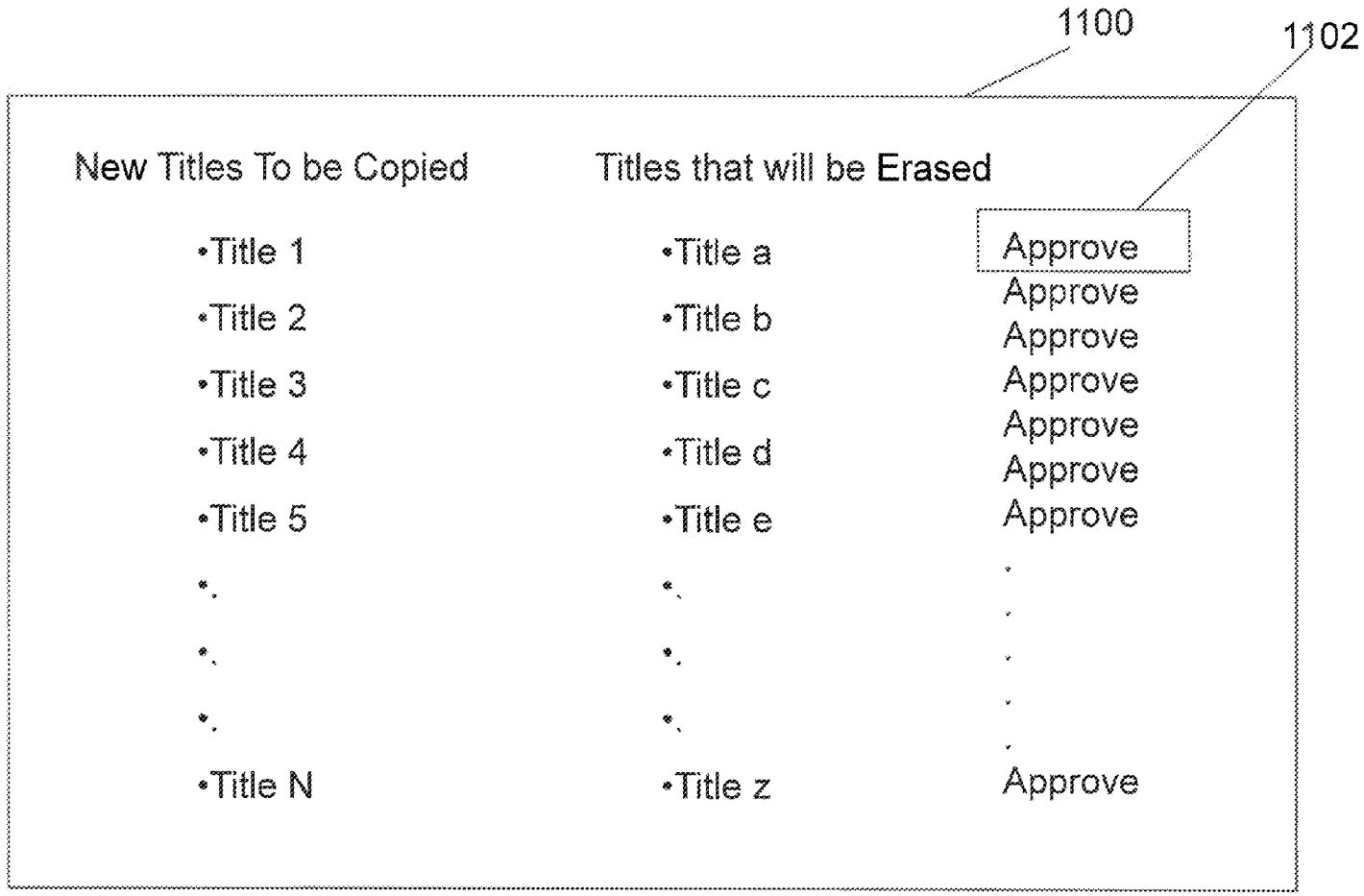
FIG. 11 shows a sample menu of content to be copied and content that will be erased along with a request for the user to approve the updates.

FIG. 11 schematically illustrates a screen 1100 generated by a target player. Screen 1100 displays a sample menu of content to be copied and content that will be erased along with a request for the user to approve the updates. This is merely one example of how titles to be written to the player's local storage can be shown. Whatever type of display is chosen, users are able to select material already stored on the player to be erased in order to make room for the transfer to the player of new content. In this example, the display includes approval buttons 1102 which allow the user to easily make choices of content for erasure and download.

Users have an option to archive (FIG. 6) content to optical or other suitable digital media rather than having it erased. In this embodiment, the player has a local media attached for archiving. Additionally, users have options to set archived options ahead of time, so that content they wish saved can be archived before the portable cartridge is connected to the player. In this case, the user interface will both identify and show the content that has already been archived. The player keeps a non-volatile list of all content that has been archived as well as the playback keys required to play the content. The keys to the content are not archived with the content, but remain on the player in a secure form. It should be noted that the system has the ability to play the archived content directly from the archived disc without actually re-copying it to the player.

In addition to content being securely copied from the portable cartridge to the player, selected information is copied from the player to the portable cartridge (FIG. 1—Returned Cartridge 124). This data includes but is not limited to billing information (rental, rent to own, purchase, credits), usage data, the user's choices for content upon return on the next portable cartridge, behavior pattern information and other related or useful information. It should be noted here that the player continues to hold its information (including billing) so that in the event a return portable cartridge is damaged during shipment, the billing or other information can be picked up in a subsequent delivery/return trip. For this reason the information that is collected may contain previously updated data—even, if it was returned previously. In one embodiment this information is written in encrypted form utilizing keys that the player has stored in it, that were burned in at manufacture time, or were updated in a transaction with a portable cartridge. The information transferred to the portable cartridge from the player is stored on the media in one embodiment or in a second embodiment, on the secured flash associated with the portable cartridge or both in an alternative embodiment.

During the process of transferring data, users are greeted with a screen that delivers informative updates on the progress and steps that are being taken. Users can pick and choose various activities during the update process including viewing advertising, reading about upcoming attractions or titles, picking their next set of content they wish to receive, looking up help for a problem, or other associated activities. During the process users must pick the titles of information they wish to receive in the next delivery of the portable disc, or in one embodiment the user has available an option to delay the receipt of a portable cartridge for some period of time while on vacation or for other reasons.

Referring again to FIGS. 4 and 5, in the event that a specific piece of information is hacked or broken into, the system provides a method to completely remove the hacked content from all systems. The centralized or regional processing centers have stored in them, the locations where the affected content is either resident on a player or archived. To replace the affected content, the content and/or keys (stored centrally or in regional centers) are re-encrypted with either new keys or potentially updated algorithms. Once done all new requests for the content will receive the new updated material. To replace the affected content located as user locations, a centralized or regional database is created of all locations that require the updated content. Each user, on the next delivery of their portable cartridge, receives the updated content The content is labeled, as a mandatory update and all users players are updated with the new content. In the rare event that the update required that an entire title be re-encrypted (not just the keys) users who have archived content would be required to archive the title again if they desired to continue to have a local archive.

In one embodiment, the player has a docking device for portable player(s). Typically these portable devices have smaller screens and therefore require lower quality video content. To meet these requirements, users have the ability to select different content formats for different portable devices. This content is delivered in the same way as other content (on the portable cartridge) and stored on the player's drive, or archived by the user. Once stored, the user connects the portable device into the docking port and is then greeted with a content-move menu that prompts the user and assists them in securely moving the content to the other platform. Solutions exist today for this type of secure content movement, which will not be detailed in this document. It should also be noted that portable optical players may also be attached that are capable of playing back the archive discs. In this case, the player is attached and the keys required to play the content are securely transferred to the portable device along with the associated rights for unlimited play, view x times, view y amount of time, etc.

Figure 12:
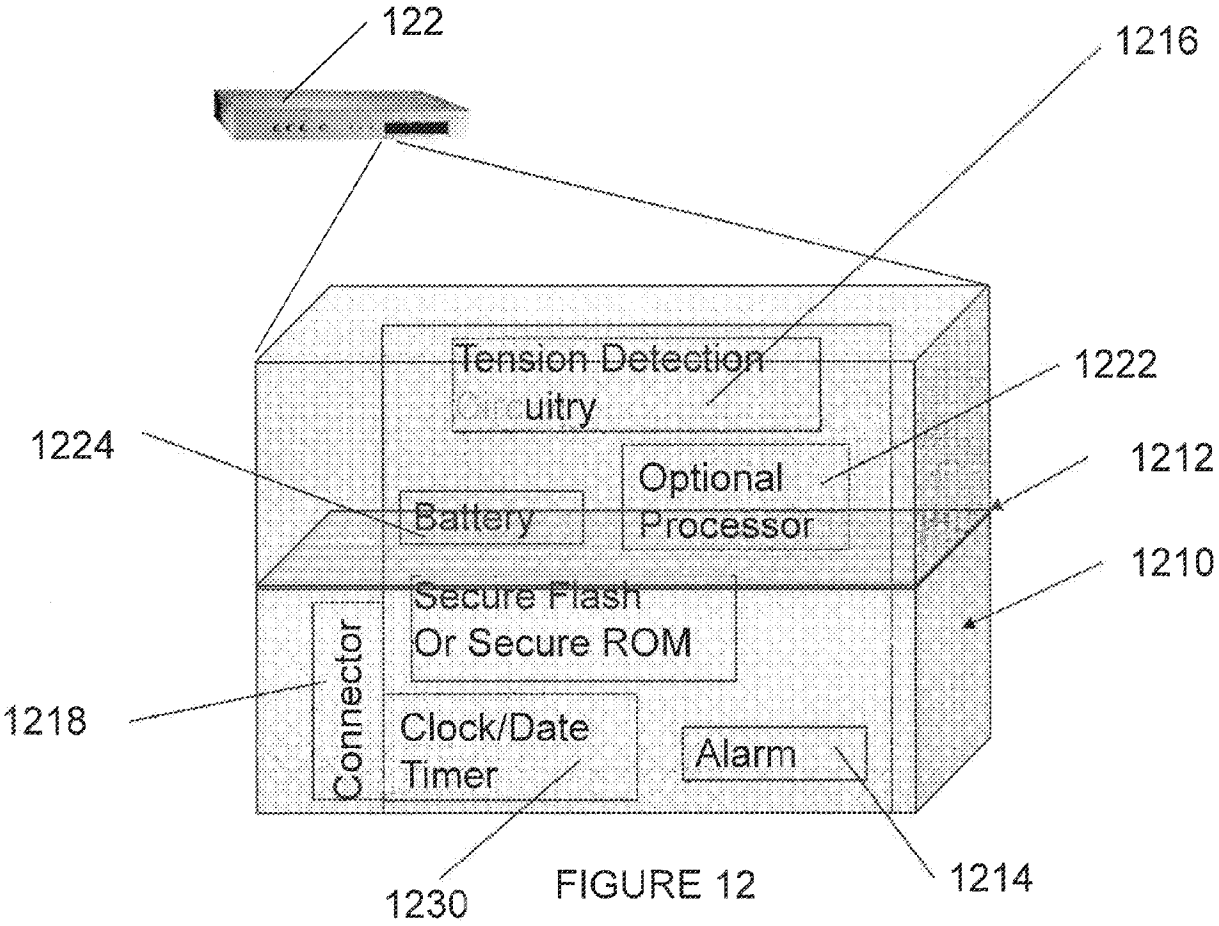
FIG. 12 is a schematic diagram that illustrates the use of a tension based tamper resistant security "lock box" for highly secure components in the player.

FIG. 12 is a schematic diagram that illustrates the use of a tension based tamper resistant security "lock box" for highly secure components in the player. To achieve additional security inside the player, one embodiment employs a tamper resistant case 1210 inside the player that houses sensitive secure circuitry. Tamper resistant case 1210 is constructed from metal, alloy, plastic or other strong material and is sealed by a tension seal 1212, the breaking of which triggers a tension based alarm 1214. Technology exists today to supply the necessary tension alarm system. As an example, tension detection circuitry 1216 can be provided for security. For other examples, see U.S. Pat. No. 6,903,286 and the like. Other alarms could also be used.

In certain hardware devices, secrets are burned or stored into chips. These secrets are typically encrypted, but no matter how advanced the encryption, eventually there must be a secret that is stored which is not encrypted—especially in the case where a specific piece of hardware requires a unique individualized identity. While information can be stored securely a number of different ways, there still usually exists a brute force method of pulling or probing content from a piece of hardware including cutting off chip covers and probing circuits to identify protected contents.

This feature provides a secure lock box for hardware where existing, tension based alarm circuits are applied to a number of chips containing important secret information. To accomplish this, the chips to be protected are designed and built into a circuit board, which can communicate via an external bus or connector 1218 to the rest of the system. This board is then encased in a box 1210 that utilizes existing tension based alarm technology including alarm 1214 and is locked down. If the alarm is tripped by someone or something attempting to open it, or access the content, then the alarm is tripped and key secured contents stored on secure flash or secure ROM 1220 are erased or otherwise rendered useless. The alarm system should advantageously employ an electronic alarm that can be passed to a security program executed by a battery 1224 operated processor 1222 inside the lock box, which erases or makes secret content unusable. Processor 1222 executes a security program that causes the secret content to be erased. The arrangement includes a switch system that enables the lock box to be locked down without tripping the alarm, and then after some period of time, reverts to the tamper state. This is important because the alarm will trip during initial installation, but the contents should not be erased at this stage. Then once the lock box is secured, the contents can then be under control of the alarm tripping mechanism. The system includes the ability to program a clock/date timer 1230 to set a time duration needed before the alarm is set. Chargeable batteries 1224 keep the alarm and processor working even if removed from the hardware device. A battery check can be provided to automatically trip alarm 1214 and erases the contents in the lock box when battery power begins to fade. Thus, if the lock box is removed and kept on a shelf for 1 year with no battery charge applied, the contents would be erased near the end of battery life and a suspect hacker upon waiting a year would still find the contents gone upon opening up the lock box. Besides tension conditions, if a hacker attempts to carefully drill through a bus mounting, certain wire crosses or cut wires may also trip the alarm and erase contents.

The invention claimed is:

1. A method comprising:

storing a [second] *public* encryption key, corresponding as a public-private key pair to a [first] *private* encryption key, into a key vault;

storing the [first] *private* encryption key in a secure memory device in a player;

encrypting, using a *first* content key, a digital content file;

encrypting, using the [second] *public* encryption key, the *first* content key for use with the player;

storing [resulting encrypted digital content comprising] the encrypted digital content file and the encrypted *first* content key on a *first* portable medium, *the first portable medium configured to be used with the player*; [and]

transmitting the *first* portable medium to the player*; and*

*in response to detecting a compromise of security:*

*re-encrypting the digital content file with a second content key;*

*encrypting, using the public encryption key, the second content key;*

*storing the re-encrypted digital file and the encrypted second content key on a second portable medium; and*

*transmitting the second portable medium to the player.*

2. The method according to claim 1, further comprising storing the encrypted digital content *file and the encrypted first content key* in a hard drive associated with the *first* portable medium.

3. The method according to claim 1, further comprising storing the encrypted digital content *file and the encrypted first content key* in an optical drive associated with the *first* portable medium.

4. The method according to claim 1, further comprising storing the encrypted digital content *file and the encrypted first content key* in a solid-state memory associated with the *first* portable medium.

5. The method according to claim 1, further comprising receiving the *first* portable medium at a predetermined location*, the predetermined location* having *access to* the key vault [with a cloned set of keys].

[6. The method according to claim 1, further comprising:

re-encrypting digital content in response to detecting compromising of security; and replacing the compromised digital content with re-encrypted digital content on the portable medium.]

7. The method according to claim 1, further comprising:

updating encryption of the *first* portable medium that comprises a hard drive by block reading sectors of the hard drive into a memory module;

decrypting the encrypted digital content *file and the encrypted first content key* using an original encryption scheme utilized to originally encrypt the digital content *file and the encrypted first content key*;

re-encrypting the decrypted digital content *file and the decrypted first content key* using a new encryption scheme; and storing the re-encrypted digital content *file and the re-encrypted first content key* to the hard drive.

8. The method according to claim 1, further comprising:

forming a secure flash processor, *a* clock storing correct Greenwich Mean Time (GMT), and *a* timer in the player at time of manufacture;

adjusting the time stored in the clock at the time the player is initialized; and permitting reproduction, during predetermined time periods, of the encrypted digital content *file and the encrypted first content key* stored as data on the *first* portable medium.

9. The method according to claim 1, further comprising:

reading usage information of the encrypted digital content file from the *first* portable medium.

10. A method comprising:

sending a list of *desired* content [desired] to a content provider having access to a [second] *public* encryption key corresponding as a public-private key pair to a [first] *private* encryption key stored in a secure memory device in a player;

receiving in the player from a portable medium in communication with the player, *an encrypted first content key and* an encrypted digital content file comprising the *desired* content [desired and an encrypted content key], the encrypted digital content file encrypted with the *first* content key for use with the player and the *first* content key encrypted with the [second] *public* encryption key;

copying the encrypted *first* content key and the encrypted digital content file from the portable medium to a local storage device in the player; [and]

playing the encrypted digital content file copied to the local storage device using the [first] *private* encryption key*; and*

*in response to detection of a compromise of security:*

*receiving a re-encrypted digital content file, wherein the re-encrypted digital content file is created by re-encrypting the digital content file with a second*

*content key, and wherein the encrypted digital content file in the local storage device in the player is replaced with the re-encrypted digital content file; and*

*receiving an encrypted second content key, wherein the encrypted second content key is encrypted using the public encryption key, and wherein the encrypted first content key in the local storage device in the player is replaced with the encrypted second content key.*

11. The method according to claim 10, further comprising:

storing usage information related to the playing of the encrypted digital content file on the portable medium.

12. The method according to claim 11, further comprising:

determining that the encrypted digital content file on the local storage device has been altered and is no longer playable.

13. The method according to claim 10, further comprising:

causing the player to generate a visual screen that permits selection of particular parts of digital content stored on the portable medium for transfer to the local storage device.

14. A portable cartridge, comprising:

a connector configured to couple to a player having a corresponding [first] *private* encryption key associated therewith; and a storage device coupled to the connector, wherein the storage device is configured to store digital content *including a digital content file and a content key*, [one or more parts of which have] *wherein the content key has* been encrypted by a [second] *public* encryption key, wherein the [second] *public* encryption key is associated with the [first] *private* encryption key as a respective public-private key pair, such that the [digital] content *key* is configured to be reproduced by the player, wherein the digital content further includes a list of available digital content files and the digital content includes information for communication with a processor, *a* clock, and *a* timer, *wherein the processor, the clock, and the timer reside* in the player, and wherein the [processor, clock and timer are] *portable cartridge is* configured to communicate with the [portable cartridge] *processor, the clock, and the timer* to reproduce digital content onto a local storage medium in the player.

15. The portable cartridge of claim 14, wherein the [digital content includes a content key and a] digital content file [that] has been encrypted using the content key.

16. The portable cartridge of claim [15] *14*, wherein the content key is generated using a broadcast-based encryption algorithm, *the broadcast-based encryption algorithm utilizing a seed key to initialize an encryption process, wherein the seed key is discarded after the encryption process is initialized, and wherein further keys are generated utilizing a secret decryption algorithm known to the player.*

17. The portable cartridge of claim 14, wherein the storage device comprises one of *a group comprising:* a hard drive coupled to the connector via an interface that is an ATA, SATA, or SCSI interface[,]*;* an optical drive[,]*;* solid state memory[,]*;* a CD[,]*;* a DVD[,]*;* a flash card[,]*;* and a memory stick.

18. The portable cartridge of claim 14, wherein the connector comprises [one of a standard connector and] a proprietary connector.

19. The portable cartridge of claim 14, further comprising:

a processor onboard the storage device and configured to communicate with the player, such that the player is authorized to receive the digital content using an encrypted tunnel.

20. The portable cartridge of claim 14, wherein the list of available digital content files is filtered by preference data and the digital content further includes:

an authentication file authorizing the player to receive the digital content, ship-to information, return address information, advertising materials, a help file, and a digital content file; and digital rights associated with the digital content file, such that the digital content file is available when authorized by the digital rights being one or more of rules for digital content file usage, number of days per rental, specific times and dates for usage of the digital content file, pricing information and payment options.

*21. The method of claim 1, wherein the second portable medium is different from the first portable medium.*

*22. A method comprising:*

*storing a private encryption key in a first computing device, the private encryption key corresponding as a public-private key pair to a public encryption key;*

*encrypting, using a first content key, a digital content file;*

*encrypting, using the public encryption key, the first content key for use with the first computing device;*

*storing the encrypted digital content file and the encrypted first content key on a first portable medium, the first portable medium configured to be used with the first computing device; and*

*in response to detecting a compromise in security:*

*re-encrypting the digital content file with a second content key;*

*encrypting, using the public encryption key, the second content key;*

*storing the re-encrypted digital file and the encrypted second content key on a second portable medium; and*

*transmitting the second portable medium to the first computing device.*

*23. The method according to claim 22, further comprising:*

*storing a second private encryption key in a second computing device, the second private encryption key corresponding as a public-private key pair to a second public encryption key;*

*encrypting, using the second public encryption key, the first content key to obtain a second encrypted first content key for use with the second computing device; and*

*storing the second encrypted first content key on the first portable medium.*

*24. The method according to claim 22, further comprising:*

*reading usage information of the encrypted digital content file from the first portable medium, the usage information having been uploaded on the first portable medium by the first computing device.*

*25. The method according to claim 22, further comprising:*

*reading a list of desired content from the first portable medium, the list of desired content having been uploaded on the first portable medium by the first computing device; and*

*selecting the digital content file before encryption based on the list of desired content.*

*26. The method according to claim 22, wherein the first portable medium includes one or more processors, a clock storing correct Greenwich Mean Time (GMT), and a timer; and*

*the method further comprising:*

*storing information on a time zone of the first computing device on the first portable medium, the information to be used for updating the first computing device according to the clock and the timer of the first portable medium.*

*27. The method of claim 22, wherein the second portable medium is different from the first portable medium.*

*28. A method comprising:*

*storing a private encryption key in a media device, the private encryption key corresponding as a public-private key pair to a public encryption key;*

*receiving by the media device, from a first portable medium in communication with the media device, encrypted media content and an encrypted first content key, the encrypted first content key comprising a first content key having been encrypted using the public encryption key, and the encrypted media content having been encrypted using the first content key;*

*accessing, by the media device, the encrypted media content using the private encryption key and the first content key; and*

*in response to detection of a compromise of security:*

*receiving, by the media device from a second portable medium in communication with the media device, re-encrypted media content, the re-encrypted media content having been created by re-encrypting the media content with a second content key; and*

*receiving, by the media device from the second portable medium, an encrypted second content key, the encrypted second content key having been encrypted using the public encrypted key.*

*29. The method according to claim 28, wherein the accessing of the encrypted media content comprises:*

*decrypting the encrypted first content key using the private encryption key to obtain the first content key; and*

*decrypting the encrypted media content using the first content key to obtain decrypted media content.*

*30. The method according to claim 28, wherein the accessing of the encrypted media content comprises downloading, by the media device, the encrypted media content from the first portable medium.*

*31. The method according to claim 30, further comprising deleting, hiding, or scrambling the encrypted media content and the encrypted content key from the first portable medium after the downloading of the encrypted media content.*

*32. The method according to claim 30, further comprising encrypting, by the media device, the encrypted media content using an additional encryption key when the downloading of the encrypted media content is performed.*

*33. The method of claim 28, wherein the second portable medium is different from the first portable medium.*

*34. A media device configured to receive encrypted media content, the media device comprising:*

*a storage device configured to store a private encryption key, the private encryption key corresponding as a public-private key pair to a public encryption key; and*

*at least one processor configured to:*

*receive, from a first portable medium in communication with the media device, encrypted media content and an encrypted first content key, the encrypted first content key comprising a first content key having been encrypted using the public encryption key, and the encrypted media content having been encrypted using the first content key;*

*access the encrypted media content using the private encryption key and the first content key; and*

*in response to detection of a compromise of security:*

*receive, from a second portable medium in communication with the media device, re-encrypted media content, the re-encrypted media content having been created by re-encrypting the media content with a second content key; and*

*receive, from the second portable medium, an encrypted second content key, the encrypted second content key having been encrypted using the public encryption key.*

*35. The media device of claim 34, wherein the at least one processor accesses the encrypted media content by:*

*decrypting the first encrypted content key using the private encryption key to obtain the first content key; and*

*decrypting the encrypted media content using the first content key to obtain decrypted media content.*

*36. The media device of claim 34, wherein the at least one processor accesses the encrypted media content by downloading the encrypted media content from the first portable medium.*

*37. The media device of claim 36, wherein the at least one processor is further configured to delete, hide, or scramble the encrypted media content and the encrypted first content key on the first portable medium after downloading of the encrypted media content.*

*38. The media device of claim 36, wherein the at least one processor is further configured to encrypt the encrypted media content using an additional encryption key while downloading the encrypted media content from the first portable medium.*

*39. The media device of claim 34, wherein the second portable medium is different from the first portable medium.*

* * * * *